United States Patent
Kudo

(10) Patent No.: US 7,832,766 B2
(45) Date of Patent: Nov. 16, 2010

(54) VEHICLE FRAME JOINT FOR A SADDLE-TYPE VEHICLE, AND VEHICLE FRAME INCORPORATING SAME

(75) Inventor: Takashi Kudo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/378,071

(22) Filed: Feb. 11, 2009

(65) Prior Publication Data

US 2009/0230666 A1    Sep. 17, 2009

(30) Foreign Application Priority Data

Mar. 11, 2008    (JP)    ............... 2008-060915

(51) Int. Cl.
B62D 21/12    (2006.01)

(52) U.S. Cl. .................................................. 280/785

(58) Field of Classification Search ........... 280/781, 280/785, 798, 795, 797; 180/311, 312
See application file for complete search history.

(56) References Cited

U.S. PATENT DOCUMENTS 7,484,762 B2 *    2/2009    Miyamoto ............... 280/797

FOREIGN PATENT DOCUMENTS

| JP | S59-133386 | 9/1984 |
|----|------------|--------|
| JP | S59-160679 | 9/1984 |
| JP | H03-3119   | 1/1991 |

* cited by examiner

Primary Examiner—Faye M. Fleming
(74) Attorney, Agent, or Firm—Carrier, Blackman & Associates P.C.; William D. Blackman; Joseph P. Carrier

(57) ABSTRACT

A vehicle frame structure for a saddle-type vehicle has a vehicle frame including a subframe portion detachably mounted on a main frame, and a joint between the main frame and the subframe which is disposed in a longitudinally intermediate portion of a continuously extending frame component, wherein the frame component is kept rigid and the joint is maintained in a small size. In the joint, the frame component has a portion divided by a vertical plane into a mainframe-side joint arm and a subframe-side joint arm. The joint arms have distal ends having arcuate outer walls cut off around their fastening positions. The joint arms further have integral upstanding walls disposed on proximal ends thereof, corresponding to the cut-off arcuate outer walls of the joint arms. The joint arms are fastened to each other with the distal ends thereof fitted in cavities surrounded by the upstanding walls.

20 Claims, 10 Drawing Sheets

US 7,832,766 B2

VEHICLE FRAME JOINT FOR A SADDLE-TYPE VEHICLE, AND VEHICLE FRAME INCORPORATING SAME

CROSS-REFERENCE TO RELATED APPLICATIONS

The present invention claims priority under 35 USC 119 based on Japanese patent application No. 2008-060915, filed on Mar. 11, 2008. The entire subject matter of this priority document, including specification claims and drawings, is incorporated by reference herein.

BACKGROUND OF THE INVENTION

1. Technical Field of the Invention

The present invention relates to a vehicle frame joint and to a vehicle frame for a saddle-type vehicle, such as a motorcycle or the like.

2. Background Art

Heretofore, vehicle frame structures for saddle-type vehicles, including main frames with subframe portions bolted in a detachably mounted manner thereto, have been known (see, for example, Patent Documents 1 through 3 below). When positioning a joint between the main frame and the subframe, such as within a longitudinally intermediate portion of a continuously extending frame component, it is customary, as described in Patent Document 1, to longitudinally split the portion of the frame component at the joint into adjacent joint arms. The joint arms may be fastened together while being held in abutment against each other in the longitudinal direction. The following references provide further background: Japanese Patent Laid-open No. Sho 59-160679 ("Patent Document 1"); Japanese Utility Model Publication No. Hei 3-3119 ("Patent Document 2"); and Japanese Utility Model Laid-open No. Sho 59-133386 ("Patent Document 3").

However, the structures of the background art tend to concentrate stresses on the boundary between general cross-sectional portions of the frame component and the split joint arms, which adversely affects the rigidity of the frame component and correspondingly the rigidity of the vehicle frame. While the joint may be increased in size to keep the desired frame rigidity, the necessary corresponding enlargement of the frame component tends to adversely affect the design of the vehicle body.

Although the known frame structures have some utility for their intended purposes, a need still exists in the art for an improved frame structure. In particular, there is a need for an improved frame structure which will improve over the known frame structures.

SUMMARY OF THE INVENTION

It is an object of the present invention to provide a vehicle frame structure for a saddle-type vehicle, wherein the vehicle frame includes a portion thereof as a subframe detachably mounted on a main frame. A small and compact joint between the main frame and the subframe is disposed in a longitudinally intermediate portion of a continuously extending frame component such that the frame component remains rigid.

To solve the above problems, a first aspect of the present invention provides a vehicle frame structure for a saddle-type vehicle (e.g., a motorcycle 1 in the embodiment), having a vehicle frame (e.g., a vehicle frame 5 in the embodiment) including a portion as a subframe (e.g., a subframe SF in the embodiment) detachably mounted on a main frame (e.g., a main frame 5A in the embodiment). The subframe is bolted to the main frame such that a frame component (e.g., a right down pipe assembly 17 in the embodiment) which extends contiguously has a joint (e.g., joints K1, K2 in the embodiment) in its longitudinally intermediate portion for joining the main frame and the subframe to each other. The frame component has a portion divided by a vertical plane into a main-frame-side joint arm (e.g., 42 in the embodiment) and a sub-frame-side joint arm (e.g., 52 in the embodiment) which are fastened to each other across the vertical plane in the joint. The joint arms have distal ends with arcuate outer walls formed thereon adjacent fastening portions thereof. Integral upstanding walls (e.g., 48, 58 in the embodiment) disposed on proximal ends of each of the joint arms correspond in shape to the cut-off arcuate outer walls of the other joint arm. The joint arms fasten to each other such that the distal ends thereof fit into and abut the cavities (e.g., 49, 59 in the embodiment) formed by the upstanding walls.

According to a second aspect of the present invention, the arcuate outer walls of the distal ends of the joint arms beyond the fastening positions and upstanding walls formed in the proximal ends of the joint arms are shaped to form a mating relationship. For example, the upstanding wall of the first joint arm corresponds to the arcuate outer wall of the second joint arm. Accordingly, the joint arms may be fastened to each other by positioning the distal ends thereof into the cavities formed by the upstanding walls.

According to a third aspect of the present invention, the cross-sectional shape of the frame component near the joint and the cross-sectional shape of the joint are substantially the same as each other, e.g., both circular.

According to a fourth aspect of the present invention, a cross member (e.g., a front lower cross pipe 22) extends transversely with respect to the vehicle body near the joint (e.g., the joint K1 in the embodiment) between the frame component and a symmetric frame component (e.g., a left down pipe assembly 16 in the embodiment). Each of the frame component and the symmetric frame component has a pair of fixing members (e.g., bosses 62 in the embodiment) disposed adjacent to an end of the cross member in a longitudinal direction thereof. Engine hangers (e.g., left and right front engine hangers 34a, 34b) which are paired in the transverse direction of the vehicle body are fixed respectively to the fixing members.

According to a fifth aspect of the present invention, a cross member (e.g., a lower cross pipe 25 in the embodiment) extends transversely with respect to the vehicle body near the joint (e.g., the joint K2 in the embodiment) between the frame component and a symmetric frame component (e.g., a left down pipe assembly 16 in the embodiment). A fixing member (e.g., a mount bracket 71 in the embodiment) to which the engine hanger (a right rear lower engine hanger 36b in the embodiment) is fixed by a fastener (e.g., a fastening bolt B4 in the embodiment) is disposed on the cross member. The joint has a working hole (e.g., a lower working hole 77b in the embodiment) configured to tightening the fastener.

According to the first and second aspects described above, the upstanding wall of the first joint arm corresponds to the cut-off arcuate outer wall of the distal end of the opposing joint arm. Integrally forming the upstanding wall on the proximal ends of the joint arms reduces a concentration of stress in the boundary between the general cross-sectional portions of the frame component and the divided joint arms. Accordingly, the rigidity of the frame component and, correspondingly, the vehicle frame may be maintained.

By rounding off the distal ends of the joint arms to form the arcuate outer walls thereof, fastening positions disposed between the proximal and distal ends maintain the mechanical strength of the joint while the upstanding walls of each joint arm reinforce the proximal ends of the opposing joint arms. Accordingly, the rigidity of the frame component may be efficiently maintained without requiring an increase in the size of the joints.

By fastening the joint arms to each other such that the distal ends thereof are fit into the cavities provided by the upstanding walls of the proximal ends of the joint arms, greater rigidity may be achieved in the joint than by simply holding and fastening the joint arms in abutment against each other. Accordingly, the rigidity of the frame component and hence the vehicle frame may be maintained.

According to the third aspect of the present invention, the size of the joint and the rigidity of the frame are both maintained with respect to each other. For example, the size of the joint does not need to be increased simply to maintain the same degree of rigidly of the frame.

According to the fourth aspect of the present invention, the main frame is reinforced by a cross member near the joint. The main frame is additionally reinforced with the engine as attached by way of the engine hanger. Reinforcing the main frame with the engine by way of the engine hanger reduces the load on the joint, and correspondingly, the rigidity of the vehicle frame in its entirety is well maintained.

According to the fifth aspect, a working hole that is defined in the joint is effective to efficiently install and detach the engine hanger.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Figure 1:
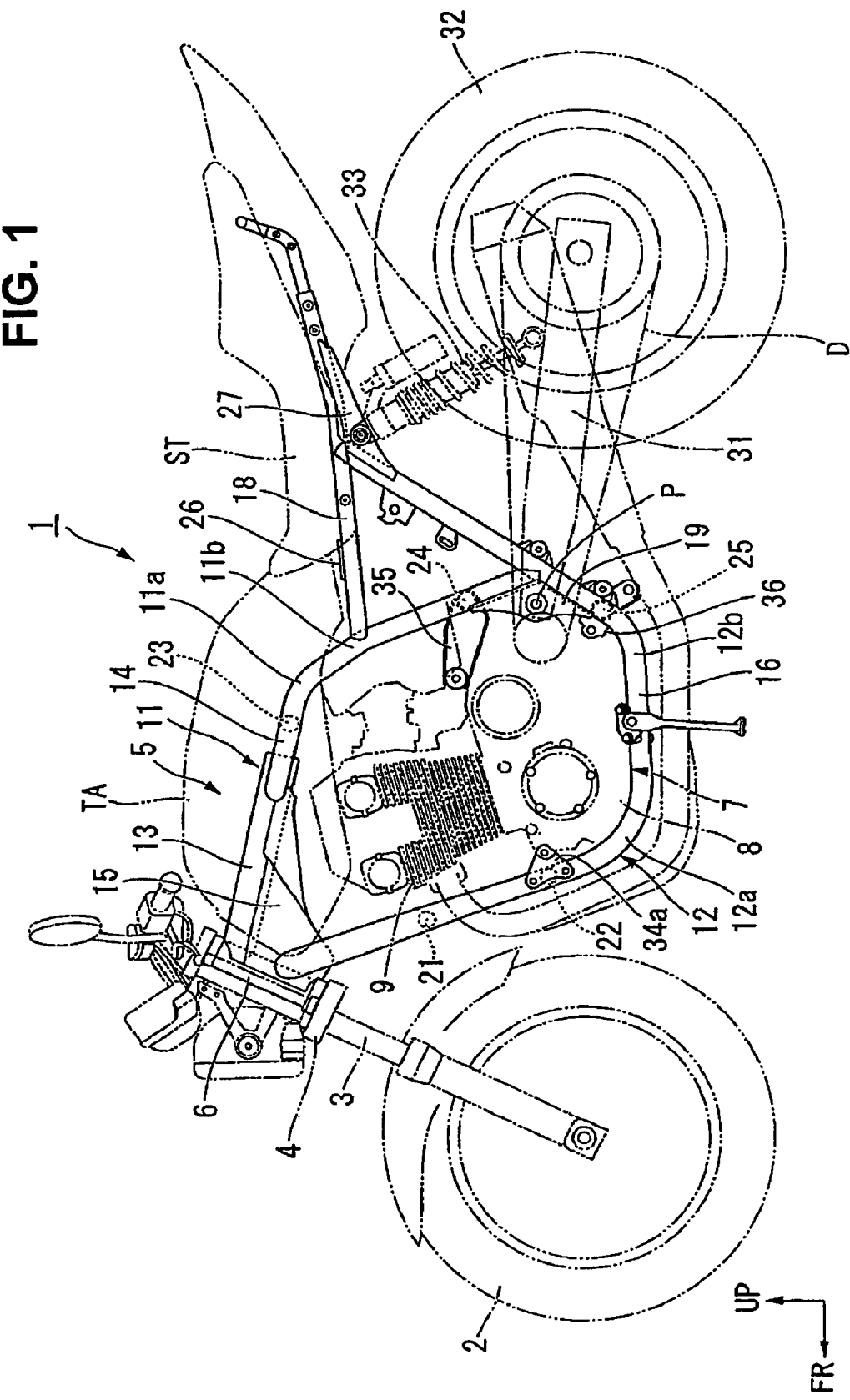
FIG. 1 is a left side elevational view of a motorcycle according to an illustrative embodiment of the present invention.

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. Also in the drawings, the arrow FR represents the forward direction of the vehicle, the arrow LH the left-hand direction of the vehicle, and the arrow UP the upward direction of the vehicle. It should be understood that these terms are used for purposes of illustration, and are not intended to limit the invention.

A motorcycle (saddle-type vehicle) 1 shown in FIG. 1 has a front wheel 2 as a steerable wheel rotatably supported on the lower end of a front fork 3 having an upper portion steerably supported by a head pipe 6 of a vehicle frame 5 through a steering column 4. The vehicle frame 5 includes a plurality of steel members integrally joined together by welding or the like into a so-called cradle structure that surrounds an engine (internal combustion engine) 7 which is positioned in a substantially central location of the vehicle body.

Figure 2:
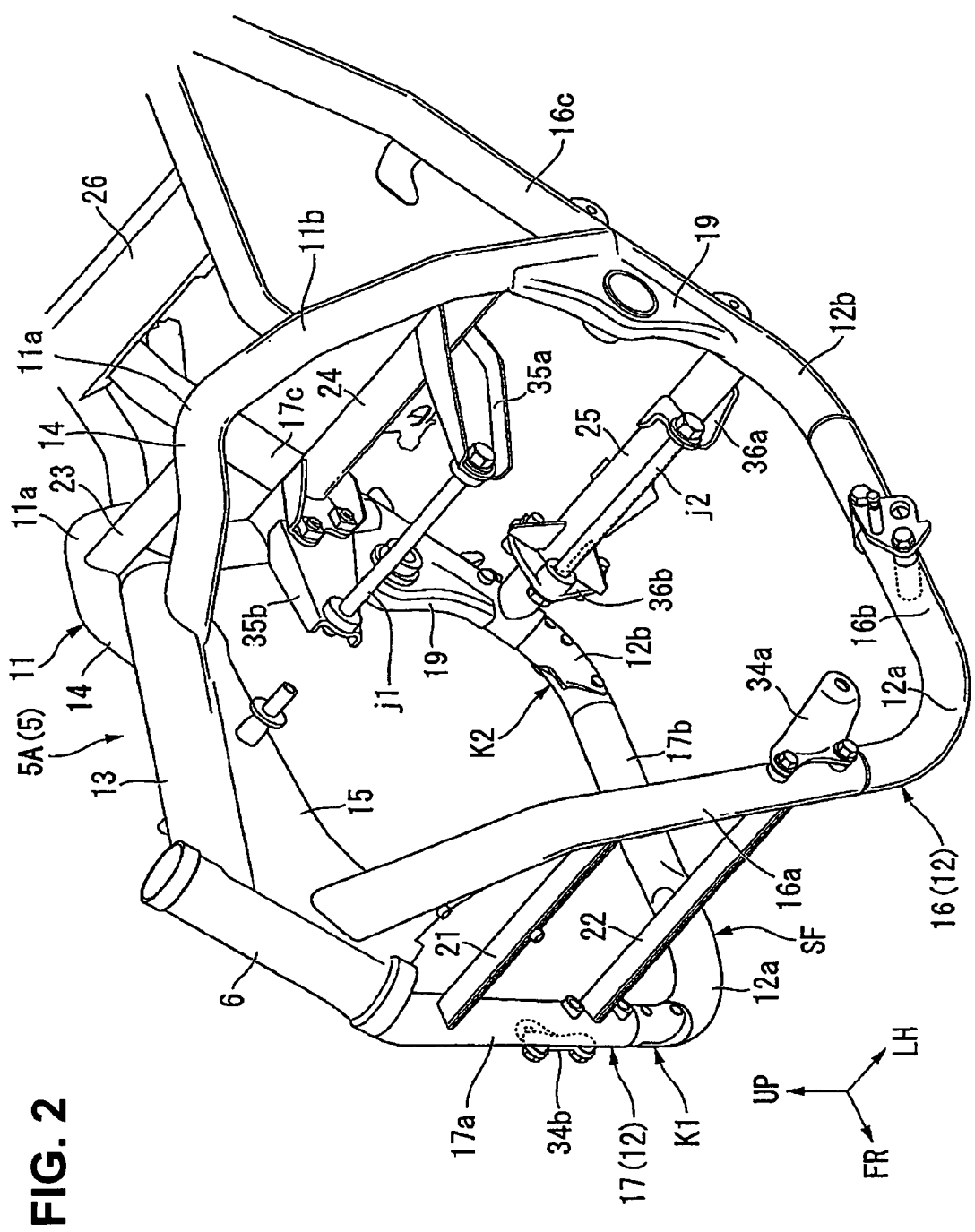
FIG. 2 is a perspective view, as seen from a front upper left side, of the vehicle frame of the motorcycle.

As also shown in FIG. 2, the vehicle frame 5 has a main frame 11 extending from a position above the engine 7 to a position rearward of the engine 7. A down frame 12 of the vehicle frame 5 extends from a position in front of the engine 7 to a position below the engine 7.

The main frame 11 extends obliquely downwardly and rearwardly from an upper portion of the head pipe 6 at a relatively small gradient, is then curved downwardly through first and second bends 11a, 11b at a relatively large gradient, and extends obliquely rearwardly and downwardly. The first bend 11a of the main frame 11 near the head pipe 6 is bent at a greater angle than the second bend 11b which is positioned rearwardly (downwardly) of the first bend 11a. The portion of the main pipe 11 which extends from the head pipe 6 to a position in front of the first bend 11a includes a single front main pipe 13. The portion of the main pipe 11 which extends rearwardly from the front main pipe 13 includes a pair of left and right central main pipes 14.

The front main pipe 13 includes a straight round steel pipe having a relatively large diameter, and has a front end abutting against and integrally welded to a rear side of the upper portion of the head pipe 6. The left and right central main pipes 14, which include respective curved round pipes each having a relatively small diameter, are spaced progressively wider arrangement from each other toward their rear ends. The portions of the left and right central main pipes 14 which extend forwardly from the first bend 11a are bent obliquely inwardly toward each other and have their front ends obliquely abutting against and integrally welded to opposite sides of a rear portion of the front main pipe 13.

A head pipe gusset 15 is mounted on a lower surface of the front main pipe 13. The head pipe gusset 15 extends over and is integrally welded to the lower surface of the front main pipe 13 and a rear surface of a lower portion of the head pipe 6.

The down frame 12 extends obliquely rearwardly and downwardly at a relatively large gradient from a position near the lower portion of the head pipe 6, is curved rearwardly at a front curved corner 12a in a lower portion of the vehicle body, then extends substantially horizontally (specifically, slightly upwardly in the rearward direction), and is curved upwardly at a rear curved corner 12b and extends obliquely rearwardly and upwardly. The down frame 12 includes a pair of left and right down pipe assemblies 16, 17.

The left and right down pipe assemblies 16, 17 are mainly in the form of bent round steel pipes which are widely spaced laterally from each other, and hence are disposed along the most outward portion of the vehicle frame 5. The left and right down pipe assemblies 16, 17 have front portions bent obliquely inwardly toward each other and upper ends obliquely abutting against and integrally welded to opposite sides of a lower portion of the head pipe gusset 15.

The left and right down pipe assemblies 16, 17 have respective rear portions extending to longitudinally intermediate portions of left and right rear upper pipes 18 that are positioned near and support a bottom plate of a rider's seat ST. The rear portions of the left and right down pipe assemblies 16, 17 are bent obliquely toward each other near the longitudinally intermediate portions of left and right rear upper pipes 18 and have upper ends obliquely abutting against and integrally welded to lower portions of the longitudinally intermediate portions. The left and right rear upper pipes 18 have front ends abutting against and integrally welded to rear sides of the left and right central main pipes 14 at the second bend 11b. Reference characters TA represent a fuel tank positioned in front of the seat ST and supported by the main frame 11.

The left down pipe assembly 16 is divided into a portion (left front down pipe 16a) extending from the head pipe gusset 15 to a position in front of the front curved corner 12a, a portion (left lower pipe 16b) extending from the left front down pipe 16a to a position in front of the rear curved corner 12b, and a portion (left rear down pipe 16c) extending from the left lower pipe 16b to the left rear upper pipe 18. These portions are integrally welded together at the divided positions.

The right down pipe assembly 17 is divided into a portion (right front down pipe 17a) extending from the head pipe gusset 15 to a position in front of the front curved corner 12a, a portion (right lower pipe 17b) extending from the right front down pipe 17a to an intermediate portion of the rear curved corner 12b, and a portion (right rear down pipe 17c) extending from the right lower pipe 17b to the right rear upper pipe 18. These portions are detachably bolted together at the divided positions.

The left and right central main pipes 14 have respective lower ends obliquely abutting against and integrally welded to respective front sides of portions of the left and right down pipe assemblies 16, 17 which are slightly spaced obliquely rearwardly and upwardly from the rear curved corners 12b. Left and right pivot gussets 19 are mounted on front sides of the lower ends of the left and right central main pipes 14. The left and right pivot gussets 19 extend over and are integrally welded to the front sides of the lower ends of the left and right central main pipes 14 and front sides of portions of the left and right down pipe assemblies 16, 17 above the rear curved corners 12b.

The above-described vehicle frame 5 construction provides one exemplary cradle structure configured for mounting the engine 7 therein.

A front middle cross pipe 21 and a front lower cross pipe 22 extend laterally (in a widthwise direction of the vehicle body) between vertically intermediate portions and lower portions of the left and right front down pipes 16a, 17a. A front cross pipe 23 and a central cross pipe 24 extend laterally between front portions and lower portions of the left and right central main pipes 14. A lower cross pipe 25 extends laterally between portions of the left and right down pipe assemblies 16, 17 which are positioned immediately obliquely rearwardly and upwardly of the rear curved corners 12b. A central cross plate 26 extends laterally between front portions of the left and right rear upper pipes 18. Left and rear cushion gussets 27 extend over the rear sides of upper ends of the left and right rear down pipes 16c, 17c and the lower sides of longitudinally intermediate portions of the left and right rear upper pipes 18.

As shown in FIG. 1, a pivot shaft P which supports the front end of a swing arm 31 has left and right arms supported on vertically intermediate portions of the left and right pivot gussets 19. A rear wheel 32, which serves as a drive wheel, is rotatably supported by left and right arms of the swing arm 31. Left and right rear cushion units 33 are interposed between rear portions of the left and right arms of the swing arm 31 and the left and rear cushion gussets 27.

The engine 7 includes, for example, a parallel-four-cylinder engine having a crankshaft extending laterally (in the widthwise direction of the vehicle). The engine 7 includes a crankcase 8 with cylinders 9 vertically mounted on a front portion thereof. The crankshaft is housed in the front portion of the crankcase 8, which also houses a transmission in a rear portion thereof. The output power from the engine 7 is transmitted from a left side of the crankcase 8, for example, to the rear wheel 32 through a chain-drive transmitting mechanism D.

The crankcase 8 has a front end supported on front portions of the left and right down pipe assemblies 16, 17 by left and right front engine hangers 34a, 34b, and a rear end whose upper portion is supported on the central cross pipe 24 by left and right rear upper engine hangers 35a, 35b and whose lower portion is supported on the lower cross pipe 25 by left and right rear lower engine hangers 36a, 36b.

The left and right front engine hangers 34a, 34b are detachably bolted to the left and right down pipe assemblies 16, 17, respectively. The left rear upper engine hanger 35a and the left rear lower engine hanger 36a are welded to the central cross pipe 24 and the lower cross pipe 25, respectively. The right rear upper engine hanger 35b and the right rear lower engine hanger 36b are detachably bolted to the central cross pipe 24 and the lower cross pipe 25, respectively. Engine mount shafts j1, j2 extend between the left and right rear upper engine hangers 35a, 35b and between the left and right rear lower engine hangers 36a, 36b.

The vehicle frame 5 includes a main frame 5A in the form of an inseparable welded structural body and a subframe SF detachably bolted to the main frame 5A. The subframe SF includes the right lower pipe 17b of the right down pipe assembly 17. As described above, the left and right front engine hangers 34a, 34b, the right rear upper engine hanger 35b, and the right rear lower engine hanger 36b are also detachably bolted to the main frame 5A.

The engine 7 can easily be dismounted from the right side of the vehicle frame 5 when the engine hangers 34b, 35b, 36b and the subframe SF are detached from the main frame 5A.

Figure 3:
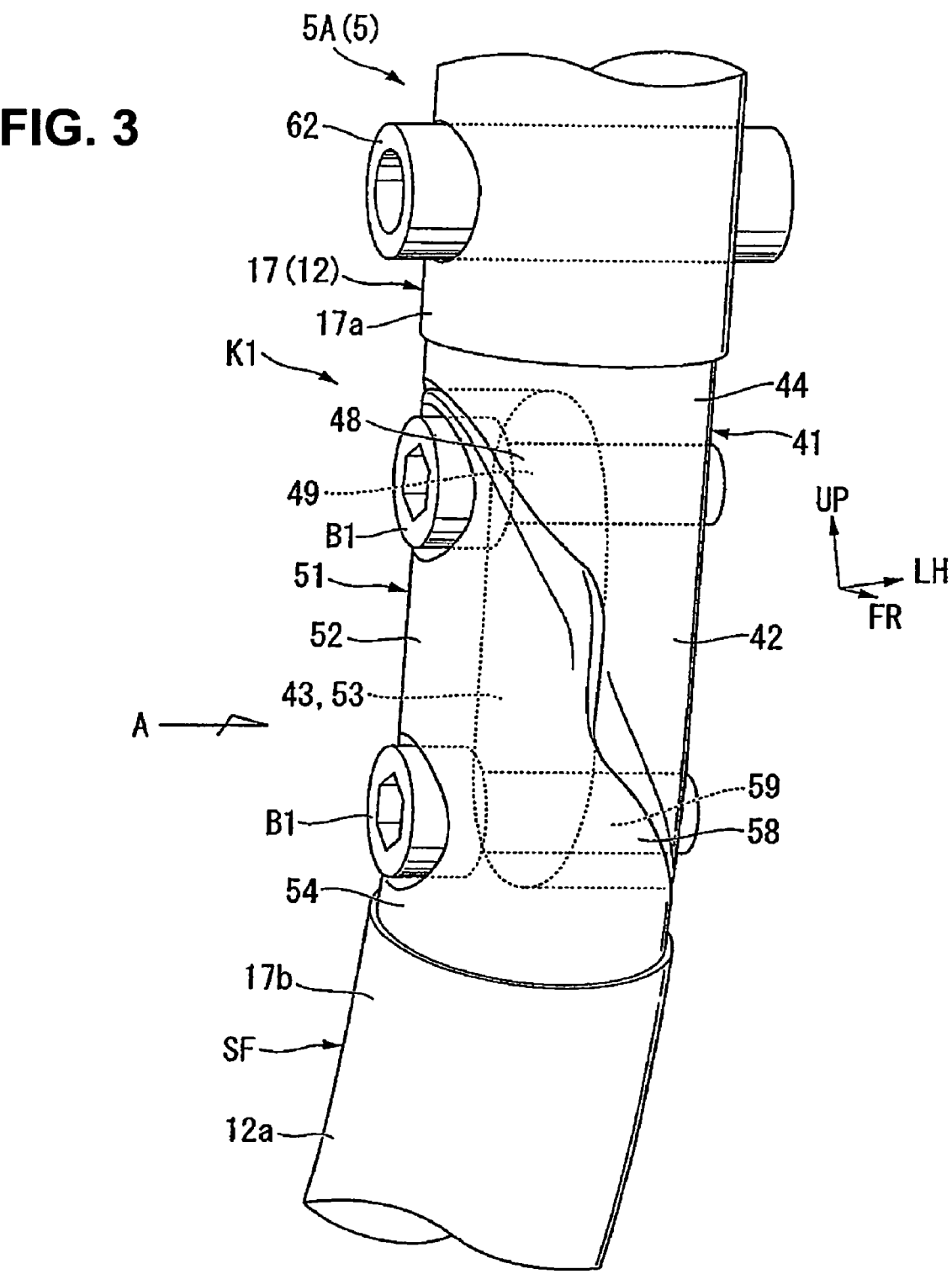
FIG. 3 is a perspective view, as seen from a front right side, of a joint of a subframe in a lower right portion of the vehicle frame.

A front joint K1 between the lower end of the lower end of the right front down pipe 17a and the front end of the right lower pipe 17b will be described below with reference to FIGS. 3 and 4. A rear joint K2 (see FIG. 2) between the lower end of the right rear down pipe 17c and the rear end of the right lower pipe 17b is of the same structure as the front joint K1.

The front joint K1, which has a predetermined length, is interposed between the ends of the right front down pipe 17a and the front end of the right lower pipe 17b. The front joint K1 includes a main-frame-side terminal member 41 integral with the right front down pipe 17a (the main frame 5A) and a subframe-side terminal member 51 integral with the right lower pipe 17b (the subframe SF).

The terminal members 41, 51 are in the form of castings or forgings. The terminal members 41, 51 have a main-frame-side joint arm 42 and a subframe-side joint arm 52, respectively, which have a contiguous cylindrical shape that is divided from the right front down pipe 17a and the right lower pipe 17b by a vertical plane extending along the longitudinal direction of the right down pipe assembly 17 diametrically across the right down pipe assembly 17. The joints arms 42, 52 are each substantially symmetric and semicircular in cross section.

The joint arm 42 that is integral with the right front down pipe 17a (the main frame 5A) is positioned laterally inwardly. The joint arm 52 that is integral with the right lower pipe 17b (the subframe SF) is positioned laterally outwardly. The joints arms 42, 52 have respective inner side surfaces 43, 53 facing each other substantially perpendicularly to the lateral direction. The front portion of the right down pipe assembly 17 is slightly inclined such that the upper portion thereof as viewed in front elevation is positioned laterally inwardly. The inner side surfaces 43, 53 are also slightly inclined in alignment with the front portion of the right down pipe assembly 17.

The joint arm 42 includes an integral base 44 disposed near the right front down pipe 17a having shape corresponding to a relatively short portion of the cylindrical shape referred to above. The base 44 includes a hollow cylindrical short collar 44a near the right front down pipe 17a. The short collar 44a is inserted in the end of the right front down pipe 17a. Further, the end of the right front down pipe 17a and the base 44 are integrally and circumferentially welded to each other fully therearound. The base 44 has a recess defined therein which opens into the short collar 44a.

Similarly, the joint arm 52 includes an integral base 54 disposed near the right lower pipe 17b having a shape corresponding to a relatively short portion of the cylindrical shape referred to above. The base 54 includes a hollow cylindrical short collar 54a near the right lower pipe 17b. The short collar 54a is inserted in the end of the right lower pipe 17b. The end of the right lower pipe 17b and the base 54 are integrally and circumferentially welded to each other fully therearound. The base 54 has a recess defined therein which opens into the short collar 54a.

The main-frame-side joint arm 42 has a plurality of (a pair of upper and lower) nut holes 45 defined respectively in a proximal end portion thereof (near the base 44) and a distal end portion thereof (remote from the base 44) substantially parallel to the lateral direction. The subframe-side joint arm 52 has a plurality of (a pair of upper and lower) bolt insertion holes 55 defined respectively in a proximal end portion thereof (near the base 54) and a distal end portion thereof (remote from the base 54) coaxially with the nut holes 45. The nut holes 45 and the bolt insertion holes 55 are spaced from each other a predetermined distance in the longitudinal directions of the right down pipe assembly 17.

Fastening bolts B1 are inserted laterally inwardly into the respective bolt insertion holes 55 in the subframe-side joint arm 52, and have their shanks threaded and tightened in the respective nut holes 45 in the main-frame-side joint arm 42, thereby fastening the joint arms 42, 52 and the terminal members 41, 51. Accordingly, the right front down pipe 17a and the right lower pipe 17b are contiguously and integrally bolted to each other.

Figure 4:
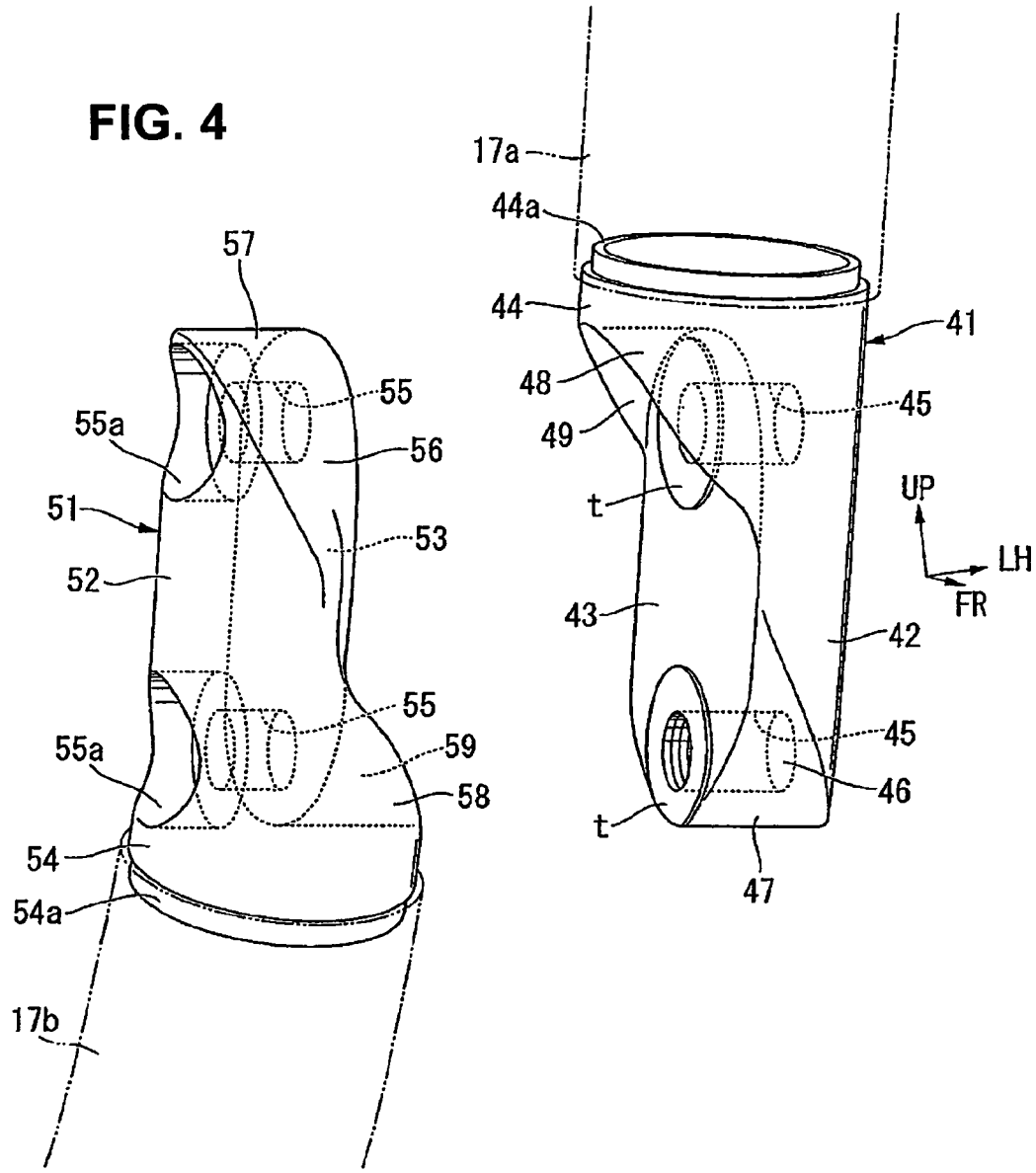
FIG. 4 is an exploded perspective view, as seen from a front right side of the joint.

At least one of the inner side surfaces 43, 53 of the joint arms 42, 52 has thin convex seat surfaces t disposed respectively around the nut holes 45 and the bolt insertion holes 55 (FIG. 4 shows those on the main-frame-side joint arm 42). The subframe-side joint arm 52 has countersunk holes 55a defined in an outer circumferential portion thereof around the respective bolt insertion holes 55 for receiving the heads of the fastening bolts B1.

Figure 5:
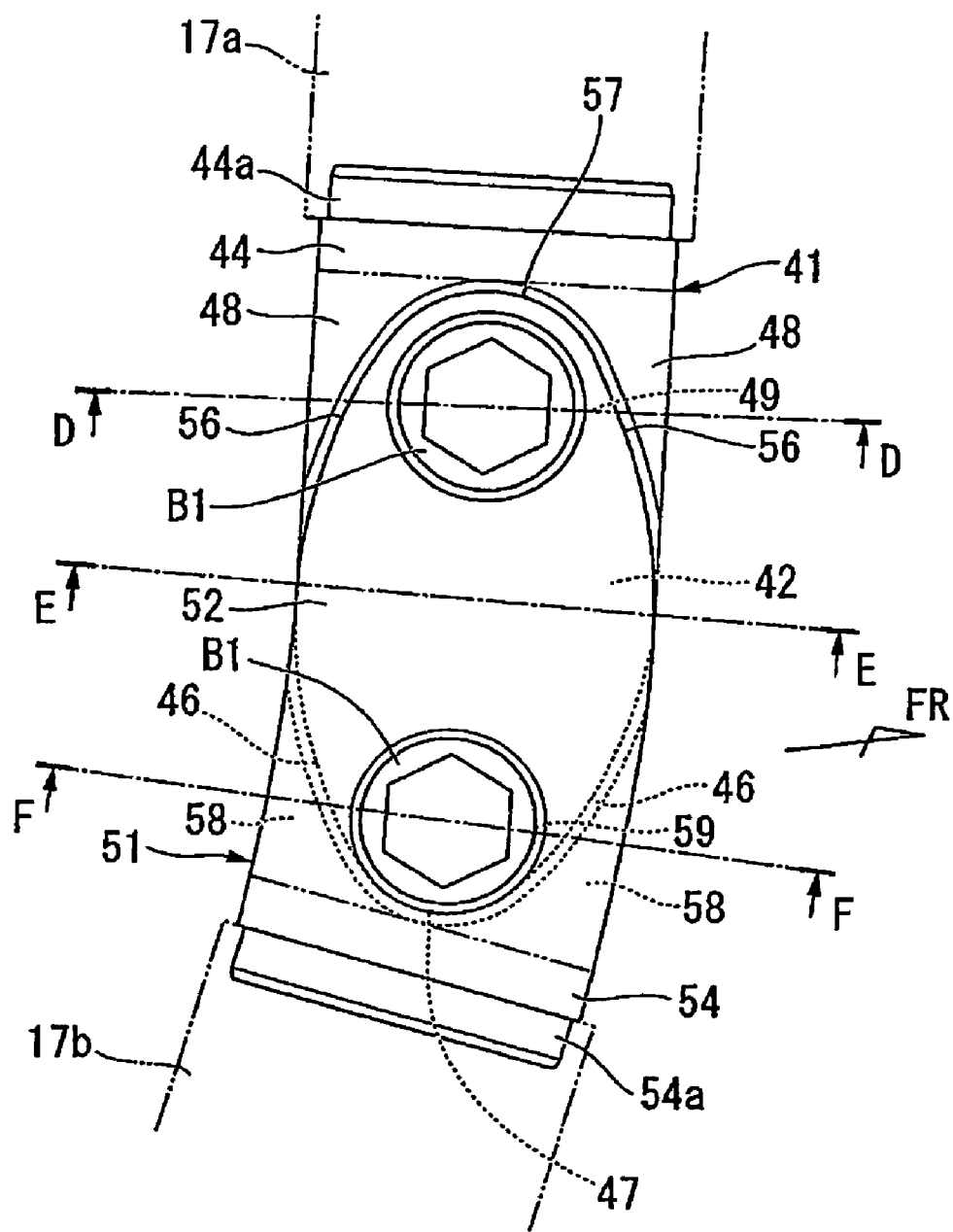
FIG. 5 is a view showing the joint as viewed in the direction indicated by the arrow A in FIG. 3.

As also shown in FIG. 5, the joint arms 42, 52 have their distal end portions tapered with their opposite sides obliquely and gradually cut or rounded off arcuately as viewed in the axial directions of the nut holes 45 and the bolt insertion holes 55 (as viewed along the arrow in the fastening direction). The cut-off sides of the distal end portions of the joint arms 42, 52 provide obliquely curved surfaces 46, 56 substantially parallel to the axial directions of the nut holes 45 and the bolt insertion holes 55.

The distal ends of the joint arms 42, 52 are cut off arcuately coaxially with the nut holes 45 and the bolt insertion holes 55, providing semi-cylindrical distal end surfaces 47, 57 thereon. The distal end surface 47 and the opposite obliquely curved surfaces 46 of the main-frame-side joint arm 42 nestingly engage each other, and the distal end surface 57 and the opposite obliquely curved surfaces 56 of the subframe-side joint arm 52 also nestingly engage each other. Stated otherwise, the arcuate outer walls of the distal ends of the joint arms 42, 52 are cut off around the fastening portions of the distal ends, i.e., around the nut holes 45 and the bolt insertion holes 55.

The joint arms 42, 52 also have integral upstanding walls 48, 58 disposed on the proximal ends and the inner side surfaces 43, 53 thereof and shaped to compliment to the curved arcuate outer walls of the distal ends of the joint arms 52, 42. The upstanding walls 48, 58 define respective cavities 49, 59 near the proximal ends of the joint arms 42, 52 for receiving in mated arrangement therein the distal ends of the joint arms 52, 42. The joint arms 42, 52 are fastened to each other with the distal ends of the joint arms 52, 42 being fitted in the respective cavities 49, 59. Therefore, the joint arms 42, 52 and hence the right front down pipe 17a and the right lower pipe 17b are rigidly coupled to each other.

If clearances are provided between the arcuate outer walls of the distal ends of the joint arms 42, 52 and the inner circumferential surfaces of the upstanding walls 48, 58 of the joints arms 52, 42, then the subframe SF can easily be attached to and detached from the main frame 5A. However, if the arcuate outer walls of the distal ends of the joint arms 42, 52 and the inner circumferential surfaces of the upstanding walls 48, 58 of the joints arms 52, 42 are tapered for snugly fitting engagement and pressed against each other, then the joint arms 42, 52 are rigidly coupled to each other, resulting in an increase in the rigidity of the vehicle frame 5.

The upstanding wall 48 of the joint arm 42 is progressively higher toward the base 44 at the proximal end of the joint arm 42 and the opposite sides of the inner side surface 43, and joins the base 44 on its substantially entire surface. Similarly, the upstanding wall 58 of the joint arm 52 is progressively higher toward the base 54 at the proximal end of the joint arm 52 and the opposite sides of the inner side surface 53, and joins the base 54 on its substantially entire surface.

Therefore, the cross-sectional shape of the joint arms 42, 52 changes gradually toward the bases 44, 54 (corresponding to the general cross-sectional portions of the right front down pipe 17a and the right lower pipe 17b, and the upstanding walls 48, 58 serve as counterbraces between the joint arms 42, 52 and the bases 44, 54. Accordingly, stresses are prevented from concentrating on the boundaries between the joint arms 42, 52 and the bases 44, 54.

Figure 10A:
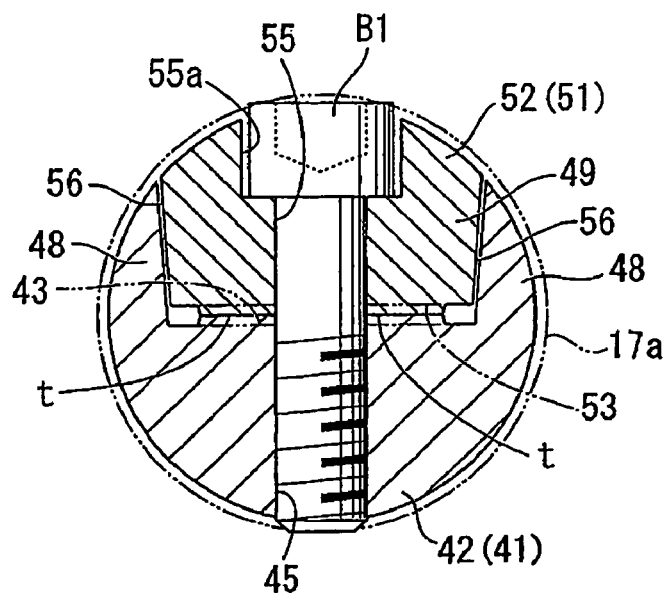
FIG. 10(a) is a cross-sectional view taken along line D-D of FIG. 5.
Figure 10B:
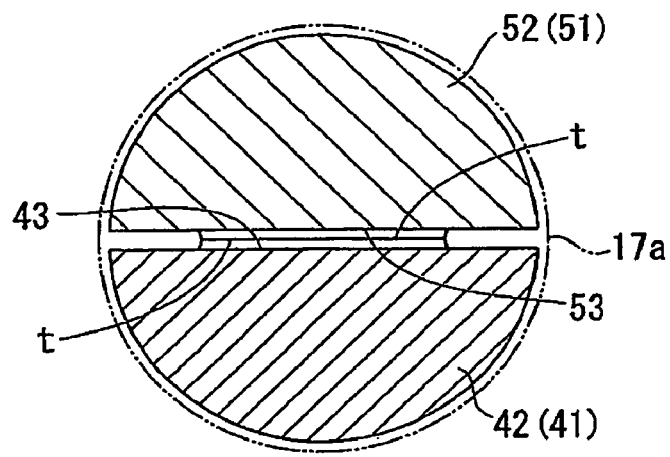
FIG. 10(b) is a cross-sectional view taken along line E-E of FIG. 5.
Figure 10C:
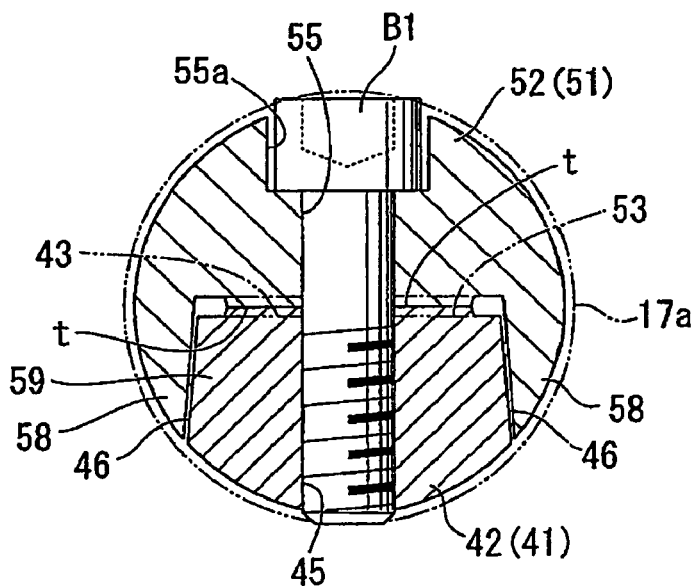
FIG. 10(c) is a cross-sectional view taken along line F-F of FIG. 5.

FIG. 10 shows that the outer profile (outside diameter and size) of the cross section of the joint K1 is substantially uniform throughout the proximal end, intermediate, and distal end portions of the joint arms 42, 52, i.e., it is substantially uniform in the longitudinal directions of the joint K1 (the right down pipe assembly 17), and is substantially the same as the outer profile (outside diameter and size) of the cross section of the right down pipe assembly 17 (the right front down pipe 17a in FIG. 10) at least in the vicinity of the joint K1. In the joint K1, therefore, the right down pipe assembly 17 has a generally continuous appearance.

Figure 6:
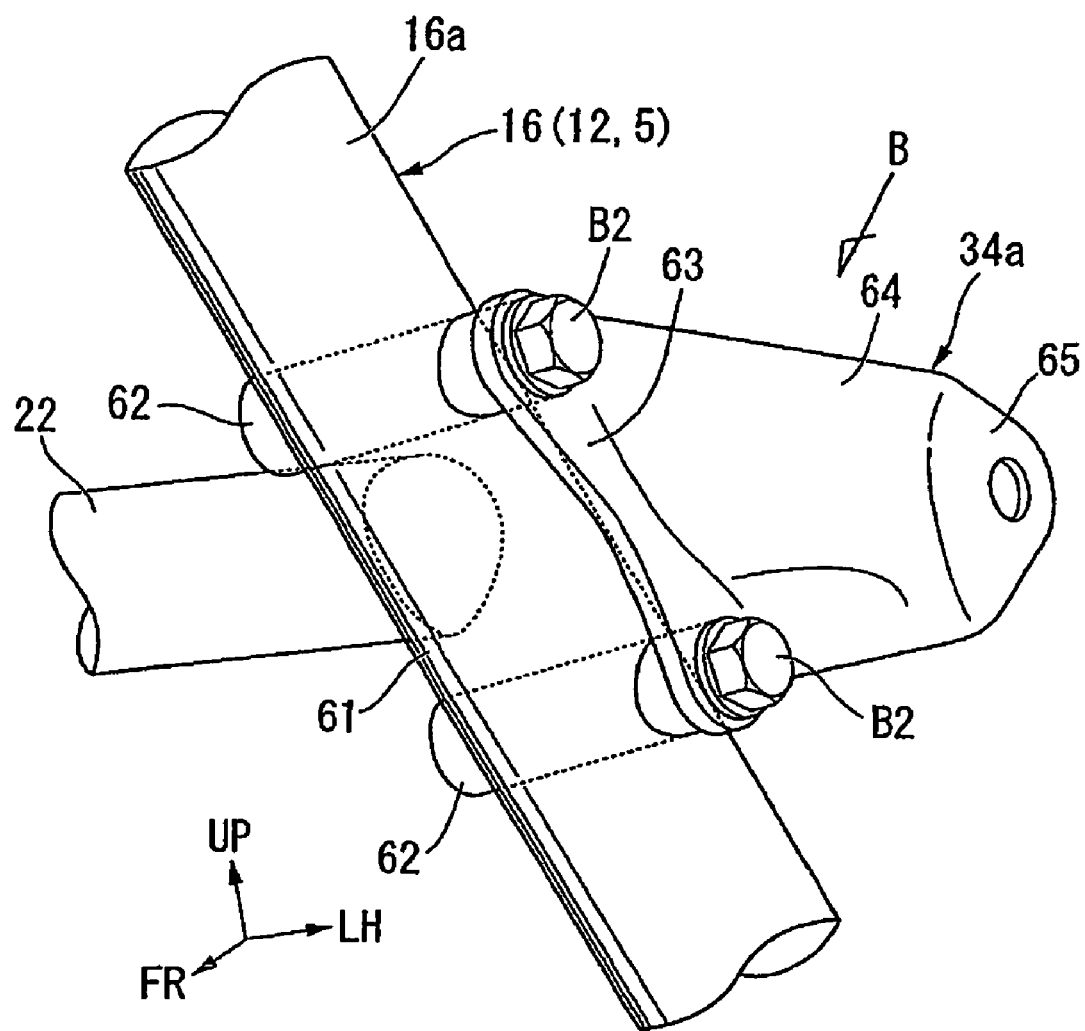
FIG. 6 is a perspective view, as seen from a front left side, of a front engine hanger and nearby parts in a lower left portion of the vehicle frame.
Figure 7:
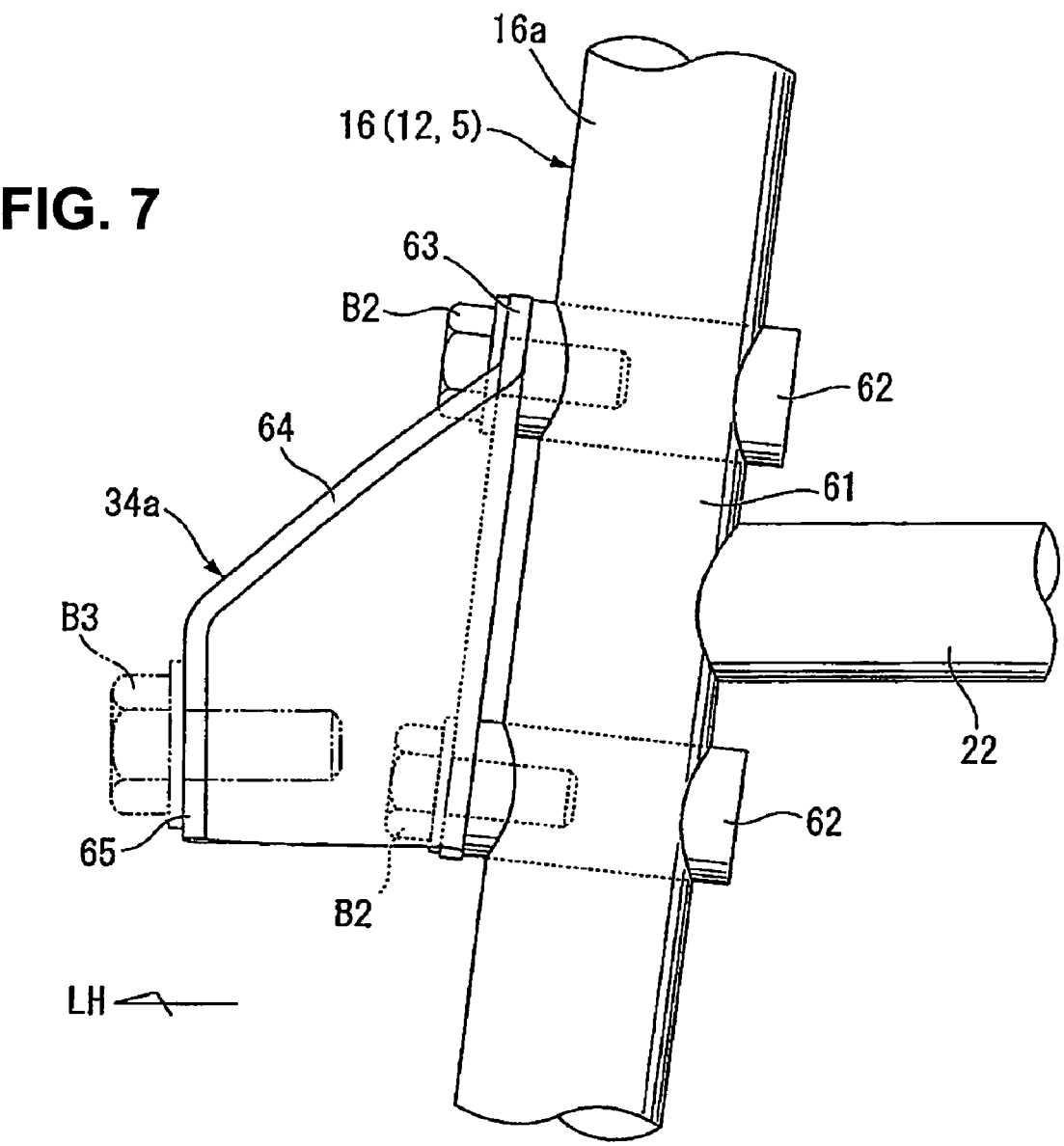
FIG. 7 is a view showing the front engine hanger and nearby parts as viewed in the direction indicated by the arrow B in FIG. 6.

The left front engine hanger 34a and nearby parts will be described below with reference to FIGS. 6 and 7. The right front engine hanger 34b and nearby parts are of a structure which is in symmetric relation to the structure shown in FIGS. 6 and 7.

The left front engine hanger 34a is detachably fixed to a hanger attachment 61 on a lower portion of the left front down pipe 16a by a pair of upper and lower fastening bolts B2.

The left front down pipe 16a extends obliquely rearwardly and downwardly from the head pipe gusset 15 as viewed in side elevation, and is slightly inclined such that the upper portion thereof is positioned laterally inwardly as viewed in front elevation. A pair of upper and lower bosses 62 is fixed to the hanger attachment 61 on the lower portion of the left front down pipe 16a, the upper and lower bosses 62 projecting laterally through the left front down pipe 16a diametrically thereacross.

The upper and lower bosses 62 are each hollow and cylindrical, and are juxtaposed in the longitudinal directions of the left front down pipe 16a. The upper and lower bosses 62 have laterally outer end faces lying in the same plane and have at least outer end portions having internally threaded inner circumferential surfaces, thereby providing nut holes.

The opposite ends of the upper and lower bosses 62 are fully circumferentially welded to the opposite sides of the left front down pipe 16a. The front lower cross pipe 22 has a left end integrally welded to a laterally inner surface of the left front down pipe 16a between the upper and lower bosses 62.

The left front engine hanger 34a, which is in the form of a pressed steel plate, includes a fastening flange 63 having a lateral inner surface held against the lateral outer end faces of the upper and lower bosses 62, an upstanding wall 64 extending obliquely rearwardly and laterally outwardly from a rear edge of the fastening flange 63 and having a vertical width progressively smaller laterally outwardly, and a support flange 65 extending rearwardly from a distal end of the upstanding wall 64. The fastening flange 63, the upstanding wall 64, and the support flange 65 are integrally combined with each other. The fastening flange 63 is fastened to the laterally outer end faces of the upper and lower bosses 62 by the upper and lower fastening bolts B2. The support flange 65 is fastened to the front end of the crankcase 8 of the engine 7 by a support bolt B3.

The fastening flange 63 is slightly inclined along the left front down pipe 16a such that the upper portion of the fastening flange 63 is positioned laterally inwardly. The support flange 65 is disposed vertically perpendicularly to the lateral directions. The upstanding wall 64 that extends between the flanges 63, 65 is of a partly spherical shape which is gradually convex obliquely forwardly and laterally outwardly. Accordingly, the left front engine hanger 34a is more rigid than an engine hanger in the form of a simply bent steel plate, and hence may be made thinner (lighter).

Figure 8:
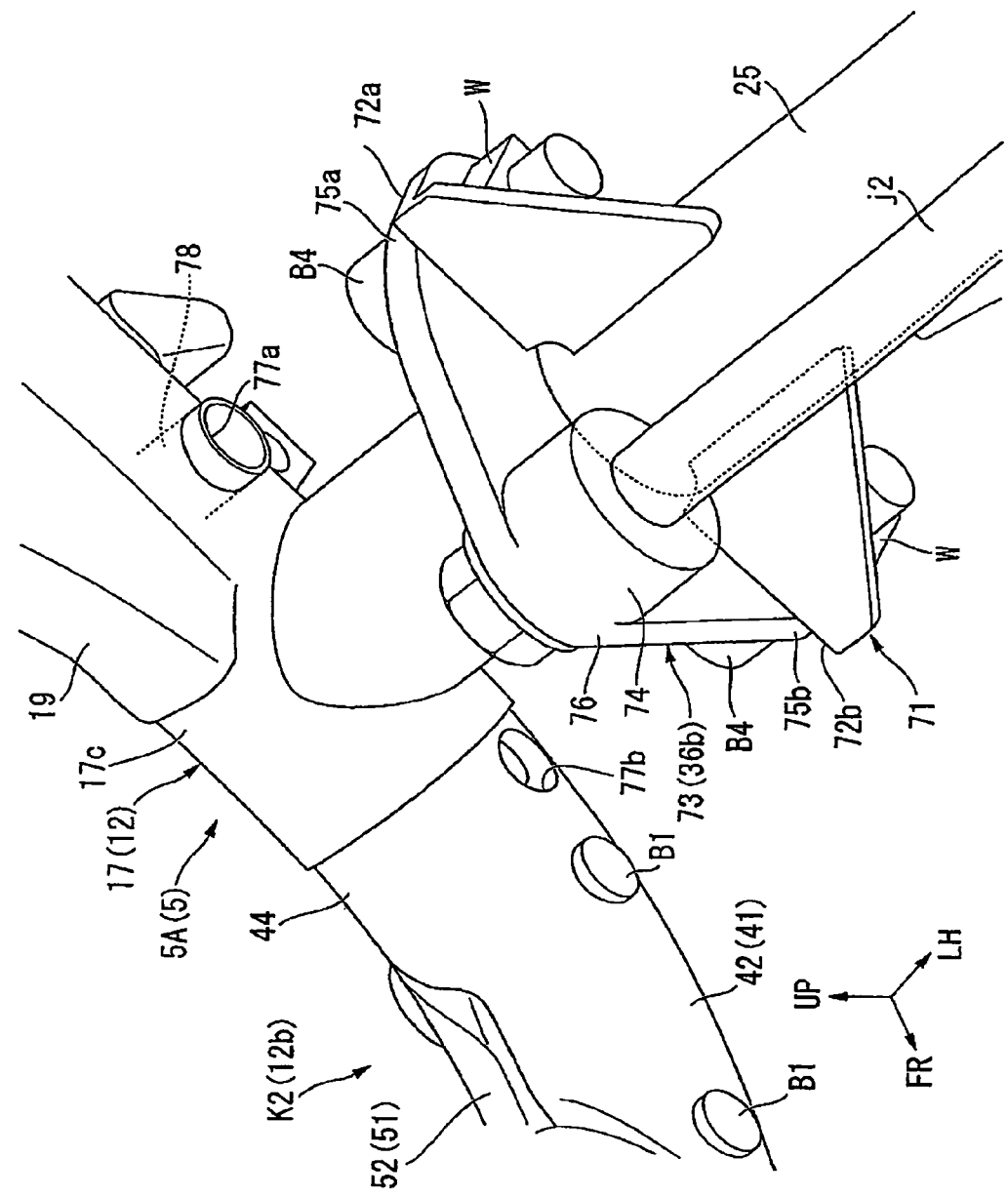
FIG. 8 is a perspective view, as seen from a front upper left side, of a rear lower engine hanger and nearby parts in a lower right portion of the vehicle frame.
Figure 9:
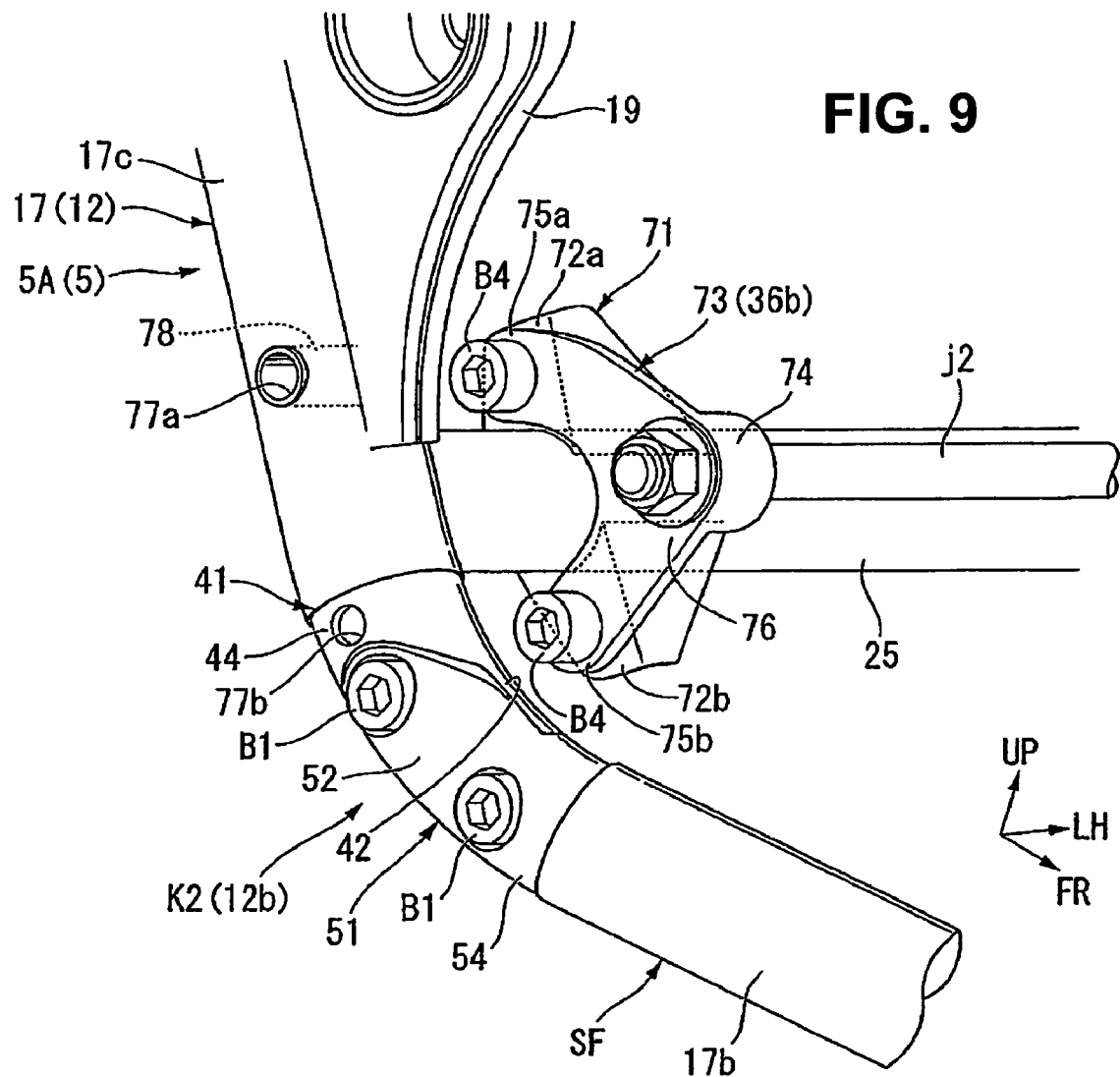
FIG. 9 is a perspective view, as seen from a front upper right side, of the rear lower engine hanger.

The right rear engine hanger 36b and nearby parts will be described below with reference to FIGS. 8 and 9.

The right rear engine hanger 36b is detachably fastened to a mount bracket 71 secured to a right side portion of the lower cross pipe 25 by a pair of upper and lower fastening bolts B4.

The mount bracket 71 includes a vertical upper mount flange 72a secured to an obliquely upward rear side of the lower cross pipe 25 and extending perpendicularly to the lateral direction, and a vertical lower mount flange 72b secured to an obliquely downward front side of the lower cross pipe 25 and extending perpendicularly to the lateral direction. The mount flanges 72a, 72b are disposed adjacent to and laterally inwardly of the rear curved corner 12b of the right down pipe assembly 17. The mount flanges 72a, 72b have lateral outer surfaces lying flush with each other, with welded nuts W being fixed to lateral inner surfaces thereof. As viewed in side elevation, the mount bracket 71 does not project radially inwardly of the rear curved corner 12b, and hence does not present an obstacle to the installation and removal of the engine 7 on the right side of the vehicle body.

The right rear engine hanger 36b is in the form of a casting or a forging, for example. The right rear engine hanger 36b includes a flat hanger body 73 having a lateral inner surface held against the lateral outer surfaces of the mount flanges 72a, 72b, and a boss 74 projecting integrally laterally inwardly from the flat hanger body 73. The hanger body 73 is of a V shape extending across the lower cross pipe 25 as viewed in side elevation and includes distal ends serving as upper and lower fastening ends 75a, 75b fastened to the respective mount flanges 72a, 72b. The V-shaped hanger body 73 also has a bottom positioned obliquely upwardly and forwardly of the lower cross pipe 25 and serving as a support 76 from which the boss 74 projects laterally inwardly. The support 76 and the boss 74 jointly support the right end of the engine mount shaft j2.

The right rear engine hanger 36b is fastened to the mount bracket 71 using circular upper and lower working holes 77a, 77b that are defined laterally through the right down pipe assembly 17 near the rear curved corner 12b. Specifically, the fastening bolts B4 are fastened to the respective mount flanges 72a, 72b that are disposed near a lateral inner side of the right down pipe assembly 17, by a tool inserted through the working holes 77a, 77b.

The upper working hole 77a extends laterally through a lower end portion of the right rear down pipe 17c, and the lower working hole 77b extends laterally through the base 44 of the main-frame-side terminal member 41 at the rear joint K2. Particularly, a tubular collar 78 is inserted in the upper working hole 77 laterally across the right rear down pipe 17c, and has opposite ends welded fully circumferentially to the opposite sides of the right rear down pipe 17c, thereby keeping the rigidity of the lower end portion of the right rear down pipe 17c.

Each of the fastening bolts B4 includes a hexagonal socket head bolt, and can be fastened with a hex key wrench. Therefore, the working holes 77a, 77b may be smaller in diameter than if a tool for usual hexagonal head bolts, and the rigidity of the right rear down pipe 17c is not adversely affected.

As described above, the vehicle frame structure according to the present embodiment is applicable to the motorcycle 1 including the vehicle frame 5 whose lower right portion includes the subframe SF detachably bolted to the main frame 5A. The right down pipe assembly 17 which extends contiguously has the joints K1, K2 in its longitudinally intermediate portion for joining the main frame 5A and the subframe SF to each other. In the joints K1, K2, the right down pipe assembly 17 has a portion divided by a vertical plane into the main-frame-side (first) joint arm 42 and the subframe-side (second) joint arm 52 which are fastened to each other across the vertical plane. The joint arms 42, 52 have distal ends having arcuate outer walls rounded off beyond the fastening positions on the distal ends. The joint arms 42, 52 have the integral upstanding walls 48, 58 disposed on the proximal ends that compliment the arcuate outer wall of the opposing joint arm.

The joint arms 42, 52 are fastened to each other with the distal ends thereof fitted in the cavities 59, 49 formed by the upstanding walls 58, 48.

The mated arrangement of the upstanding walls 48, 58 with the corresponding arcuate outer walls of the distal ends of the joint arms 52, 42 reduces stress concentration in the boundary between the general cross-sectional portions of the right down pipe assembly 17 and the divided joint arms 42, 52. Accordingly, the rigidity of the right down pipe assembly 17 and hence the vehicle frame 5 is maintained.

Fastening positions between the rounded off the arcuate outer walls on the distal ends of the joint arms and the upstanding walls of the proximal ends of the joint arms provide mechanical strength to the joint. Moreover, the upstanding walls 48, 58 that compliment the arcuate outer walls (excessive portions) reinforce the proximal ends of the joint arms 52, 42. The rigidity of the right down pipe assembly 17 is thus efficiently maintained without requiring an increase in the size of the joints K1, K2.

Inasmuch as the joint arms 42, 52 are fastened to each other with the distal ends thereof fitted in the cavities 59, 49 of the joint arms 52, 42, the joint arms 42, 52 are joined to each other with greater rigidity than if the joint arms are simply fastened and held in abutment against each other. Accordingly, the rigidity of the right down pipe assembly 17 and hence the vehicle frame 5 is further maintained.

With the above vehicle frame structure, the cross-sectional shape of the right down pipe assembly 17 near the joints K1, K2 and the cross-sectional shape of the joints K1, K2 are substantially the same as each other. For example, the cross-sectional shapes may each be circular. Consequently, the size of the joints K1, K2 does not need to be increased simply to provide the same degree of rigidity in the right down pipe assembly 17.

With the above vehicle frame structure, the front lower cross pipe 22 extends transversely with respect to the vehicle body near the joint K1 between the right down pipe assembly 17 and the left down pipe assembly 16 which is in substantially symmetric relation to the right down pipe assembly 17 in the transverse direction of the vehicle body. Each of the right down pipe assembly 17 and the left down pipe assembly 16 has the pair of bosses 62 disposed between the front lower cross pipe 22 in the longitudinal direction thereof. The left and right front engine hangers 34a, 34b, which are paired in the transverse direction of the vehicle body, are fixed respectively to the bosses 62. The main frame 5A is reinforced by the front lower cross pipe 22 near the joint K1, and is also reinforced through the left and right front engine hangers 34a, 34b by way of the engine 7. By using the engine to reinforce the main frame 5A, the load on the joint K1 is reduced, and the rigidity of the vehicle frame 5 in its entirety is well maintained.

Additionally, the lower cross pipe 25 extends transversely of the vehicle body near the joint K2 between the right down pipe assembly 17 and the left down pipe assembly 16 which is in substantially symmetric relation to the right down pipe assembly 17 in the transverse direction of the vehicle body. The mount bracket 71 to which the right rear lower engine hanger 36b is fixed by the fastening bolts B4 is disposed on the lower cross pipe 25, and the joint K2 has the lower working hole 77b which is to be used for tightening the fastening bolts B4. The main frame 5A is reinforced by the lower cross pipe 25 near the joint K2. Accordingly, the load on the joint K2 is reduced, and the rigidity of the vehicle frame 5 in its further maintained. The lower working hole 77b that is defined in the joint K2 allows for the installation and detachment of the right rear lower engine hanger 36b.

The present invention is not limited to the above embodiment. The distal end of only one of the joint arms 42, 52 may have its arcuate outer wall cut off, and only the other of the joint arms 52, 42 may have the upstanding wall and the cavity. Each of the joint arms 42, 52 may be fastened by one or three or more fastening bolts. The joint arms 42, 52 may be fastened in other directions such as vertical directions rather than the lateral directions.

The joints between the main frame and the subframe may be provided in frame components other than the right down pipe assembly 17, and frame components may have other cross-sectional shapes such as a rectangular shape other than the circular shape. Furthermore, the above embodiment may be applied to only the joint on one end of the subframe.

The above embodiment is illustrated by way of example only. The present invention is also applicable to a scooter-type motorcycle as well as to three-wheeled or four-wheeled saddle-type vehicles which have low foot rests.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A vehicle frame structure for a saddle-type vehicle, comprising:
    a main frame;
    a subframe detachably mounted to the main frame, and including a contiguously extending frame component;
    at least one joint arranged along a longitudinally intermediate portion of the contiguously extending frame component, said joint configured to operatively connect the main frame and the subframe to each other;
    said at least one joint comprising:
        a first joint arm attached to a first end of the contiguously extending frame component; and
        a second joint arm attached to a second end of the contiguously extending frame component, and fastened to the first joint arm across a plane defined in the joint,
    wherein each of the joint arms includes:
    a distal end with an arcuate outer wall formed thereon, and a fastening portion disposed adjacent said arcuate outer wall, and
    a proximal end with at least one integral upstanding arcuate wall formed therein for nestingly receiving a corresponding arcuate outer wall of the other joint arm.

2. The vehicle frame structure according to claim 1, wherein the upstanding arcuate wall defines a cavity provided at the proximal end of each joint arm, and wherein the joint arms are fastened to each other at the respective fastening portions such that the distal end of said first joint arm fits nestingly into the cavity of the second joint arm.

3. The vehicle frame structure according to claim 1, wherein the cross-sectional shape of the frame component near the joint and the cross-sectional shape of the joint are substantially the same as each other.

4. The vehicle frame structure according to claim 2, wherein the cross-sectional shape of the frame component near said joint and the cross-sectional shape of said joint are substantially the same as each other.

5. The vehicle frame structure according to claim 1, further comprising:
- a cross member extending transversely to the vehicle body near the joint between the frame component and a symmetric frame component on the opposing side of the vehicle;
- a pair of fixing members, each arranged on opposing ends of the cross member, and configured to attach the cross member to the frame components; and
- a plurality of engine hangers fixed to respective fixing members.

6. The vehicle frame structure according to claim 1, further comprising:
- a cross member extending transversely to the vehicle body near the joint between the first frame component and a symmetric frame component on the opposing side of the vehicle;
- at least one fixing member disposed on the cross member;
- at least one engine hanger fixed by a fastener to said at least one fixing member; and
- a working hole disposed on said frame component and said symmetric frame component for tightening the fastener.

7. The vehicle frame structure according to claim 1, wherein the at least one joint includes first and second joints positioned along the frame component.

8. A joint for a vehicle frame, comprising:
- first and second joint arms each having a proximal end and a distal end;
- an arcuate outer wall disposed along each of said distal ends;
- an arcuate upstanding wall formed in each of said proximal ends; and
- at least one fastening position disposed between the arcuate outer wall and the arcuate upstanding wall of each of said joint arms, and configured to operatively connect the first and second joint arms together, with the arcuate outer wall of the first joint arm fit along the arcuate upstanding wall of the second joint arm and the arcuate outer wall of the second joint arm fit along the arcuate upstanding wall of the first joint arm.

9. The joint according to claim 8, wherein a plane is formed between the first and second joint arms along a mated portion thereof.

10. The joint according to claim 8, further comprising a frame component for attaching the joint to a main portion of a vehicle frame.

11. The joint according to claim 10, wherein the cross-sectional shape of the joint arms in a mated configuration substantially corresponds to the cross-sectional shape the frame component.

12. The joint according to claim 10, further comprising an engine mount attached to the frame component near the joint, the engine mount configured to reduce stress on the joint by providing rigidity from an engine attached thereto.

13. The joint according to claim 10, further comprising a cross member extending between the frame component and a symmetric frame component, the cross member configured to reduce stress on the joint by providing rigidity between the frame component and the symmetric frame component.

14. The joint according to claim 13, further comprising:
- at least one engine mount attached to the cross member; and
- at least one working hole formed in each of the frame component and the symmetric frame component for accessing a fastener attached to the engine mount.

15. A vehicle frame, comprising:
- first and second frame components; and
- a joint removably attaching the first frame component to the second frame component, the joint including
  - a first joint arm attached to the first frame component; and
  - a second joint arm symmetrically opposing the first joint arm and attached to the second frame component,
- wherein each of said joint arms provides a complimentary mating cavity formed therein, said complimentary mating cavity having at least one integral upstanding arcuate wall formed therein configured to nestingly receive a portion of the opposing joint arm therein.

16. The vehicle frame according to claim 15, further comprising:
- an arcuate outer wall disposed along a distal end of each of said joint arms;
- said upstanding arcuate wall formed in a proximal end of each of said joint arms; and
- at least one fastening position disposed between the arcuate outer wall and the upstanding arcuate wall of each of said joint arms configured to mate the joint arms together with the arcuate outer wall of the first joint arm fit along the upstanding arcuate wall of the second joint arm and the arcuate outer wall of the second joint arm fit along the upstanding arcuate wall of the first joint arm.

17. The vehicle frame according to claim 15, wherein the cross-sectional shape of the joint arms in a mated configuration substantially corresponds to the cross-sectional shape the frame components.

18. The vehicle frame according to claim 15, further comprising an engine mount attached to the one of the first and second frame components near the joint, the engine mount configured to reduce stress on the joint by providing rigidity from an engine attached thereto.

19. The vehicle frame according to claim 15, further comprising a cross member extending between the one of the first and second frame components and a respective symmetric frame component, the cross member configured to reduce stress on the joint by providing rigidity between the respective frame components.

20. The vehicle frame according to claim 19, further comprising:
- at least one engine mount attached to the cross member; and
- at least one working hole in each of the respective frame components for accessing a fastener attached to the engine mount.

* * * * *